(12) United States Patent
Guo et al.

(10) Patent No.: US 9,766,498 B2
(45) Date of Patent: Sep. 19, 2017

(54) LIQUID CRYSTAL DISPLAY

(71) Applicant: Shenzhen China Star Optoelectronics Technology Co., Ltd., Shenzhen, Guangdong (CN)

(72) Inventors: Qing Guo, Guangdong (CN); Chen Xie, Guangdong (CN); Zhongjie Liu, Guangdong (CN)

(73) Assignee: Shenzhen China Star Optoelectronics Technology, Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/417,817

(22) PCT Filed: Jan. 21, 2015

(86) PCT No.: PCT/CN2015/071224
§ 371 (c)(1),
(2) Date: May 6, 2016

(87) PCT Pub. No.: WO2016/101375
PCT Pub. Date: Jun. 30, 2016

(65) Prior Publication Data
US 2016/0246117 A1    Aug. 25, 2016

(30) Foreign Application Priority Data
Dec. 26, 2014 (CN) .......................... 2014 1 0834748

(51) Int. Cl.
*G02F 1/1333* (2006.01)
*G02F 1/1335* (2006.01)
(Continued)

(52) U.S. Cl.
CPC .. *G02F 1/133606* (2013.01); *G02F 1/133308* (2013.01); *G02F 1/133603* (2013.01);
(Continued)

(58) Field of Classification Search
None
See application file for complete search history.

(56) References Cited

U.S. PATENT DOCUMENTS

2003/0128307 A1* 7/2003 Ito ..................... G02F 1/133308
349/58
2005/0122744 A1* 6/2005 Sakuda ............. G02F 1/133615
362/617
(Continued)

FOREIGN PATENT DOCUMENTS

CN 1967351 A 5/2007
CN 101943808 A 1/2011
(Continued)

OTHER PUBLICATIONS

International Search Report and Written Opinion, Jan. 21, 2015, China.

*Primary Examiner* — Richard Kim
(74) *Attorney, Agent, or Firm* — Kim Winston LLP

(57) ABSTRACT

Related to is a liquid crystal display device, comprising: a liquid crystal display panel; a backlight module including a light guide plate having a light-emitting element, an optical diaphragm group, and a reflective plate; a glass cover covering the liquid crystal display panel and the backlight module, wherein an inner surface of the side wall of the glass cover is in contact with two side portions of the liquid crystal display panel, and two side portions of the backlight module; and a first positioning strip and a second positioning strip, respectively arranged at a top end and a bottom end of the backlight module and are both capable of being engaged with the side wall of the glass cover.

16 Claims, 2 Drawing Sheets

(51) Int. Cl.
*G02F 1/133* (2006.01)
*G02F 1/1368* (2006.01)

(52) U.S. Cl.
CPC ...... *G02F 1/133605* (2013.01); *G02F 1/1368* (2013.01); *G02F 1/13306* (2013.01); *G02F 1/133514* (2013.01); *G02F 1/133528* (2013.01); *G02F 2001/13332* (2013.01); *G02F 2001/133314* (2013.01); *G02F 2001/133322* (2013.01); *G02F 2001/133331* (2013.01); *G02F 2201/08* (2013.01)

(56) References Cited

U.S. PATENT DOCUMENTS

2008/0151138 A1* 6/2008 Tanaka .............. G02F 1/133308
  349/58
2009/0303409 A1* 12/2009 Park ................. G02F 1/133308
  349/58

FOREIGN PATENT DOCUMENTS

| CN | 102032511 A | 4/2011 |
| CN | 102508377 A | 6/2012 |
| CN | 202453600 U | 9/2012 |
| CN | 102914904 A | 2/2013 |
| CN | 203444197 U | 2/2014 |
| CN | 103912819 A | 7/2014 |

\* cited by examiner

LIQUID CRYSTAL DISPLAY

CROSS-REFERENCE TO RELATED APPLICATIONS

The present application claims benefit of Chinese patent application CN 201410834748.1, entitled "Liquid crystal display" and filed on Dec. 26, 2014, the entirety of which is incorporated herein by reference.

FIELD OF THE INVENTION

The present disclosure relates to a liquid crystal display device, and in particular, to a liquid crystal display device capable of having narrower side frame edges.

BACKGROUND OF THE INVENTION

Nowadays, liquid crystal display devices have become indispensible components of electronic products such as mobile phones and computers, and relevant mechanical apparatuses. They transmit information to people through images displayed thereby, such that people can get access to the information in time.

A liquid crystal display device substantially comprises a liquid crystal display panel, a backlight module, and a frame. The backlight module includes an optical diaphragm group, a light guide plate, and a reflective plate. The frame of the liquid crystal display device is typically used to position the backlight module, so as to ensure that the backlight module will not be easily damaged. It is necessary to provide the frame with certain strength in order to achieve the functions of positioning and protection, and with certain thickness and width in order to guarantee such strength.

As narrow-framed liquid crystal display devices are increasingly popular, a frame of an existing liquid crystal display is becoming narrower. However, the structure of the frame severely constrains frame edges of a liquid crystal display device, and in particular, restrains two side frame edges from turning narrower. As a result, it is currently impossible to constantly narrow down the side frame edges of an existing liquid crystal display device.

Therefore, there is a need of a liquid crystal display device, which can have narrower side frame edges, so as to satisfy requirements in the development of liquid crystal display devices.

SUMMARY OF THE INVENTION

In order to solve the above problem, the present disclosure provides a liquid crystal display device, which can have narrower side frame edges. Hence, the requirements in the development of liquid crystal display devices can be satisfied.

The present disclosure provides a liquid crystal display device, comprising: a liquid crystal display panel; a backlight module engaged with a back surface of the liquid crystal display panel, the backlight module including an optical diaphragm group, a light guide plate having a light-emitting element, and a reflective plate, which are successively arranged in a direction away from the liquid crystal display panel; a glass cover covering the liquid crystal display panel and the backlight module, the glass cover including a bottom wall, and a circumferential side wall, which extends from an outer edge of the bottom wall toward the reflective plate, and abuts against the reflective plate, wherein an inner surface of the side wall of the glass cover is in contact with two side portions of the liquid crystal display panel along a transverse direction thereof, and two side portions of the backlight module along a transverse direction thereof; and a first positioning strip and a second positioning strip, respectively arranged at a top end and a bottom end of the backlight module and are both capable of being engaged with the inner surface of the side wall of the glass cover.

In one embodiment, each of the first positioning strip and the second positioning strip comprises a rectangular body and a step structure formed at one edge of the rectangular body.

In one embodiment, the optical diaphragm group has a top end received at the step structure of the first positioning strip, and a bottom end abutting against the second positioning strip; and the light guide plate has a bottom end received at the step structure of the second positioning strip, and a top end abutting against the first positioning strip.

In one embodiment, two ends of each of the first positioning strip and the second positioning strip are both in contact with the inner surface of the side wall of the glass cover.

In one embodiment, the optical diaphragm group comprises a diffusion film, a brightness enhancement film, and a diffusion film successively arranged along a direction in which the liquid crystal display panel faces the light guide plate.

In one embodiment, a height of the side wall of the glass cover relative to the bottom wall thereof equals a sum of thicknesses of the backlight module and the liquid crystal display panel.

In one embodiment, the liquid crystal display panel includes a polarizing film, a color filter substrate, a liquid crystal layer, an array substrate, and a polarizer that are successively stacked, a driving circuit, and a printed circuit board.

In one embodiment, the side wall of the glass cover is provided with a light absorbing coating on the inner surface or an outer surface thereof.

In one embodiment, the reflective plate is configured in such a manner that when the reflective plate is in contact with the side wall of the glass cover, the reflective plate located outside of the side wall can, after being bended, fit together with the outer surface of the side wall of the glass cover.

In one embodiment, the glass cover has a thickness larger than 0.4 mm.

According to the liquid crystal display device of the present disclosure, the liquid crystal display panel and the backlight module can be positioned in a transverse direction by means of the side wall of the glass cover, then positioned in a vertical direction by means of the first and second positioning strips, and then finally positioned in a longitudinal direction through interaction between the glass cover and the reflective plate, so that the liquid crystal display panel and the backlight module can be fixed together. This can prevent any relative movement therebetween. Besides, a side portion of the liquid crystal display device in the transverse direction thereof is free from an arrangement of any structures similar to a frame, but is only provided with the side wall (which is rather thin) of the glass cover. Therefore, the liquid crystal display device of the present disclosure has narrower side frame edges, which can satisfy the requirements in development of liquid crystal displays.

In addition, the liquid crystal display device according to the present disclosure has simple structures, and can be easily assembled and safely used, thus facilitating implementations of promotion and use thereof.

BRIEF DESCRIPTION OF THE DRAWINGS

In the following, the present disclosure will be explained in detail based on embodiments in connection with accompanying drawings, in which.

Figure 1:
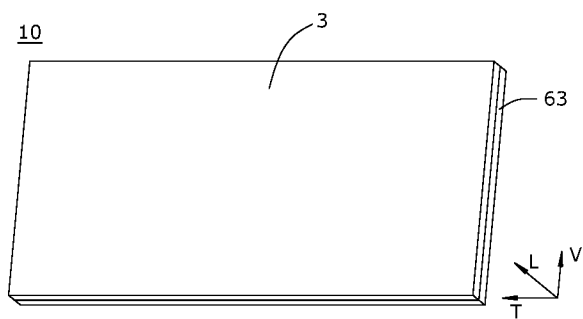
FIG. 1 schematically shows a liquid crystal display device according to the present disclosure.

In the drawings, the same components are indicated with the same reference signs. The figures are not drawn in accordance with an actual scale.

DETAILED DESCRIPTION OF THE EMBODIMENTS

The present disclosure will be further explained in conjunction with the accompanying drawings.

Figure 2:
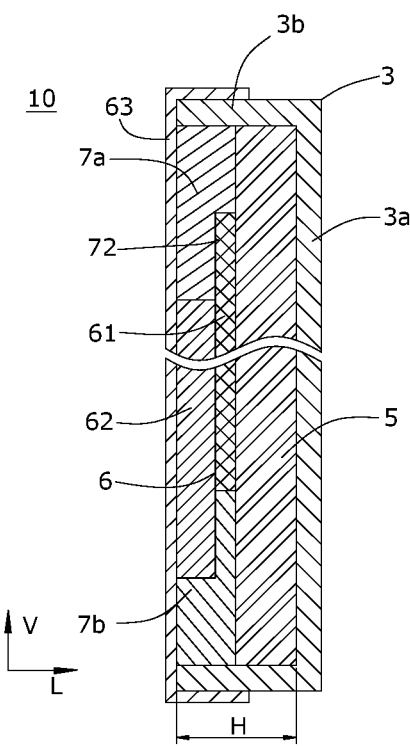
FIG. 2 is a vertical cross-section view of the liquid crystal display device as shown in FIG. 1.

FIG. 1 shows a liquid crystal display device 10 according to the present disclosure. The liquid crystal display device 10 can be a thin film transistor liquid crystal display (TFT LCD for short) device. As shown in FIGS. 1 and 2, the liquid crystal display device 10 comprises a liquid crystal display panel 5, which has a front surface and a back surface, respectively referring to an end surface with its front to a human face, and an end surface with its back to the human face during use.

The liquid crystal display panel 5 can be selected as a liquid crystal display panel of a thin film transistor liquid crystal display device, comprising a polarizing film, a color filter substrate, a liquid crystal layer, an array substrate, and a polarizer that are successively stacked, a driving circuit, and a printed circuit board. The driving circuit can be connected to the array substrate through the printed circuit board. The liquid crystal display panel of the thin film transistor liquid crystal display device is well known in the art, and therefore will not be explained in detail herein. In each of the drawings, letters V, L, and T represent a vertical direction, a longitudinal direction, and a transverse direction, respectively; and a top end, a bottom end, and a side portion respectively refer to an upper portion in the vertical direction V, a lower portion in the vertical direction V, and a left portion or a right portion in the transverse direction T.

As shown in FIGS. 1 and 2, the liquid crystal display device 10 further comprises a backlight module 6 engaged with the back surface of the liquid crystal display panel 5. The backlight module 6 can be used to provide a required light source to the liquid crystal display panel 5, so as to facilitate clear display of a picture thereby. The backlight module 6 can comprise an optical diaphragm group 61, a light guide plate 62 having a light-emitting element (not shown), and a reflective plate 63 that are successively arranged in a direction away from the liquid crystal display panel 5. The light-emitting element can be selected as an LED light with adjustable brightness, so as to facilitate adjustment of brightness of the liquid crystal display device 10. The reflective plate 63 can also be referred to as a reflective film, which, along with the light-emitting element, is well known in the art, and will not be explained in detail herein.

In one embodiment, the optical diaphragm group 61 can comprise a diffusion film, a brightness enhancement film, and a diffusion film successively arranged along a direction in which the liquid crystal display panel 5 faces the light guide plate 62, wherein the diffusion film, the brightness enhancement film, and the diffusion film are all well known in the art and therefore will not be explained in detail herein. In addition to this, the optical diaphragm group 61 can also be selected as other structures, such as a structure formed after addition or deletion of a relevant diaphragm.

Figure 3:
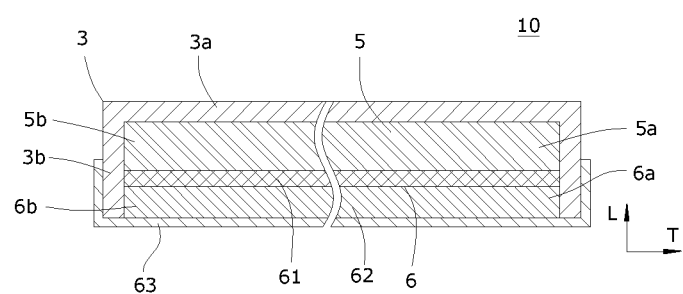
FIG. 3 is a transverse cross-section view of the liquid crystal display device as shown in FIG. 1.

The liquid crystal display device 10 can further comprise a glass cover 3 covering the liquid crystal display panel 5 and the backlight module 6. In order to ensure a required strength, it is necessary for the glass cover 3 to have a thickness larger than 0.4 mm. The glass cover 3 can comprise a bottom wall 3a in parallel with the liquid crystal display panel 5, and a circumferential side wall 3b, which extends from an outer edge of the bottom wall 3a toward the reflective plate 63, and is capable of abutting against the reflective plate 63, as shown in FIGS. 2 and 3. As indicated in FIG. 3, an inner surface of the side wall 3b of the glass cover 3 is in contact with two side portions (i.e., a side portion 5a and a side portion 5b) of the liquid crystal display panel 5 along the transverse direction T thereof, and two side portions (i.e., a side portion 6a and a side portion 6b) of the backlight module 6 along the transverse direction T thereof, thereby achieving transverse positioning of the liquid crystal display panel 5 and the backlight module 6, i.e., positioning along the transverse direction T.

As shown in FIG. 2, the liquid crystal display 10 can further comprise a first positioning strip 7a arranged at a top end (i.e., an upper portion in the vertical direction V) of the backlight module 6 and is capable of being engaged with the inner surface of the side wall 3b of the glass cover 3, and a second positioning strip 7b arranged at a bottom end (i.e., a lower portion in the vertical direction V) of the backlight module and is capable of being engaged with the inner surface of the side wall 3b of the glass cover 3. These two positioning strips can achieve vertical positioning of the liquid crystal display panel 5 and the backlight module 6, i.e., positioning along the vertical direction V. The first positioning strip 7a and the second positioning strip 7b are both made of rubber material.

Because an assembly formed by the liquid crystal display panel 5 and the backlight module 6 is located between the glass cover 3 and the reflective plate 63, longitudinal positioning of the liquid crystal display panel 5 and the backlight module 6, i.e., positioning along the longitudinal direction L, can thereby be achieved. The liquid crystal display panel 5 and the backlight module 6 can be fixed together by means of the above positioning along three directions, thereby preventing any relative movement between the liquid crystal display panel 5 and the backlight module 6. Moreover, since the liquid crystal display device 10 is free from an arrangement of any structures similar to a frame on two side portions thereof along the transverse direction, but is only provided with the side wall 3b (which is rather thin) of the glass cover 3, the liquid crystal display device 10 of the present disclosure has narrower side frame edges. Hence, the requirements for future development of liquid crystal displays can be satisfied.

Figure 4:
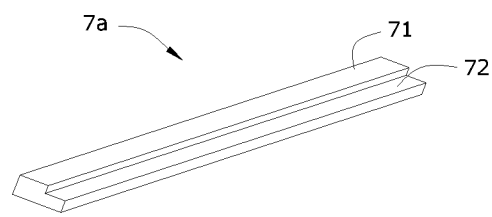
FIG. 4 shows a first positioning strip of the liquid crystal display device according to the present disclosure, which also has a second positioning strip the same as the first positioning strip in shape.

In one embodiment, each of the first positioning strip 7a and the second positioning strip 7b can comprise a rectangular body 71 and a step structure 72 formed at one edge of the rectangular body 71, as shown in FIG. 4. It can thus be seen that the first positioning strip 7a and the second positioning strip 7b have a same shape. Said step structure 72 is in the form of an opening formed after a rectangular strip is removed from the edge of the body 71, for receiving and positioning an edge of the optical diaphragm group 61 or the light guide plate 62. It can be readily understood that the positioning strips each should have a thickness slightly larger than that of the backlight module 6, so as to satisfy requirements in positioning.

After the liquid crystal display device 10 is completely assembled, the optical diaphragm group 61 has a top end (i.e., an upper end portion in the vertical direction V) received at the step structure 72 of the first positioning strip 7a, and a bottom end (i.e., a lower end portion in the vertical direction V) abutting against the second positioning strip 7b. The light guide plate 62 has a bottom end (i.e., a lower end portion in the vertical direction V) received at the step structure 72 of the second positioning strip 7b, and a top end (i.e., an upper end portion in the vertical direction V) abutting against the first positioning strip 7a. This enables stable positioning of the liquid crystal display panel 5 and the backlight module 6, and prevents them from moving along the longitudinal direction L, and meanwhile prevents the backlight module 6 from moving along the vertical direction V.

In one preferred embodiment, two ends of the first positioning strip 7a are both in contact with the inner surface of the side wall 3b of the glass cover 3, and two ends of the second positioning strip 7b are both in contact with the inner surface of the side wall 3b of the glass cover 3 also. This can improve a contact surface between each of the positioning strips and the liquid crystal display panel 5 or the backlight module 6, thereby further enhancing positioning functions of the positioning strips.

In one preferred embodiment, a height H of the side wall 3b of the glass cover 3 relative to the bottom wall 3a thereof substantially equals a sum of thicknesses of the backlight module 6 and the liquid crystal display panel 5. This enables longitudinal positioning of the assembly formed by the liquid crystal display panel 5 and the backlight module 6 by means of the glass cover 3 and the reflective plate 63, thereby preventing the liquid crystal display panel 5 or the backlight module 6 from moving along the longitudinal direction L.

In order to prevent light leakage from the side wall 3b of the glass cover 3, the side wall 3b of the glass cover 3 can be provided with a light absorbing coating on the inner surface or an outer surface thereof. The light absorbing function of the light absorbing coating can effectively prevent light from exiting the side wall 3b of the glass cover 3. The light absorbing coating can be optionally selected as blacking that can be coated on the side wall 3b of the glass cover 3, and can of course be selected as other coatings, paints, or light absorbing substances.

In order to reinforce stable connection between the reflective plate 63 and the glass cover 3, the reflective plate 63 should have a surface larger than that of the bottom wall 3a of the glass cover 3. After the reflective plate 63 is in contact with the side wall 3b of the glass cover 3, the reflective plate 63 located outside of the side wall 3b of the glass cover 3 can, after being bended, fit together with the outer surface of the side wall 3b of the glass cover 3. This can effectively enhance stable connection between the reflective plate 63 and the glass cover 3. In one preferred embodiment, the reflective plate 63 and the glass cover 3 can be bonded by double-sided adhesive, so as to reinforce stable connection therebetween.

To conclude the above, the liquid crystal display device 10 according to the present disclosure has narrower side frame edges, and therefore can satisfy the requirements in the development of liquid crystal display devices.

Although the present disclosure has been described with reference to preferred embodiments, various modifications and variants to the present disclosure may be made by anyone skilled in the art, without departing from the scope and spirit of the present disclosure. In particular, as long as there is no structural conflict, various embodiments as well as the respective technical features mentioned herein may be combined with one another in any manner. The present disclosure is not limited to the specific embodiments disclosed herein, but rather includes all the technical solutions falling within the scope of the claims.

The invention claimed is:

1. A liquid crystal display device, comprising:
   a liquid crystal display panel;
   a backlight module engaged with a back surface of the liquid crystal display panel, the backlight module including an optical diaphragm group, a light guide plate having a light-emitting element, and a reflective plate, which are successively arranged in a direction away from the liquid crystal display panel;
   a glass cover covering the liquid crystal display panel and the backlight module, the glass cover including a bottom wall, and a circumferential side wall, which extends from an outer edge of the bottom wall toward the reflective plate and abuts against the reflective plate, wherein an inner surface of the side wall is in contact with two side portions of the liquid crystal display panel along a transverse direction thereof, and two side portions of the backlight module along a transverse direction thereof; and
   a first positioning strip and a second positioning strip, respectively arranged at a top end and a bottom end of the backlight module and are both capable of being engaged with the inner surface of the side wall.

2. The liquid crystal display device according to claim 1, wherein each of the first positioning strip and the second positioning strip comprises a rectangular body and a step structure formed at one edge of the rectangular body.

3. The liquid crystal display device according to claim 2, wherein the optical diaphragm group has a top end received at the step structure of the first positioning strip, and a bottom end abutting against the second positioning strip, and
   wherein the light guide plate has a bottom end received at the step structure of the second positioning strip, and a top end abutting against the first positioning strip.

4. The liquid crystal display device according to claim 3, wherein two ends of each of the first positioning strip and the second positioning strip are both in contact with the inner surface of the side wall.

5. The liquid crystal display device according to claim 4, wherein the reflective plate is configured in such a manner that when the reflective plate is in contact with the side wall, the reflective plate located outside of the side wall can, after being bended, fit together with an outer surface of the side wall.

6. The liquid crystal display device according to claim 5, wherein the side wall is provided with a light absorbing coating on the inner surface or the outer surface thereof.

7. The liquid crystal display device according to claim 6, wherein the optical diaphragm group comprises a diffusion film, a brightness enhancement film, and a diffusion film successively arranged along a direction in which the liquid crystal display panel faces the light guide plate.

8. The liquid crystal display device according to claim 7, wherein the liquid crystal display panel includes a polarizing film, a color filter substrate, a liquid crystal layer, an array substrate, and a polarizer that are successively stacked, a driving circuit, and a printed circuit board.

9. The liquid crystal display device according to claim 8, wherein a height of the side wall relative to the bottom wall equals a sum of thicknesses of the backlight module and the liquid crystal display panel.

10. The liquid crystal display device according to claim 9, wherein the glass cover has a thickness larger than 0.4 mm.

11. The liquid crystal display device according to claim 1, wherein the optical diaphragm group comprises a diffusion film, a brightness enhancement film, and a diffusion film successively arranged along a direction in which the liquid crystal display panel faces the light guide plate.

12. The liquid crystal display device according to claim 1, wherein a height of the side wall relative to the bottom wall equals a sum of thicknesses of the backlight module and the liquid crystal display panel.

13. The liquid crystal display device according to claim 1, wherein the liquid crystal display panel includes a polarizing film, a color filter substrate, a liquid crystal layer, an array substrate, and a polarizer that are successively stacked, a driving circuit, and a printed circuit board.

14. The liquid crystal display device according to claim 1, wherein the side wall is provided with a light absorbing coating on the inner surface or the outer surface thereof.

15. The liquid crystal display device according to claim 1, wherein the reflective plate is configured in such a manner that when the reflective plate is in contact with the side wall, the reflective plate located outside of the side wall can, after being bended, fit together with an outer surface of the side wall.

16. The liquid crystal display device according to claim 1, wherein the glass cover has a thickness larger than 0.4 mm.

* * * * *